(12) United States Patent
Ozturk et al.

(10) Patent No.: US 10,716,097 B2
(45) Date of Patent: Jul. 14, 2020

(54) DISJOINT BEARER ROUTING

(71) Applicant: QUALCOMM Incorporated, San Diego, CA (US)

(72) Inventors: Ozcan Ozturk, San Diego, CA (US); Gavin Bernard Horn, La Jolla, CA (US); Vikas Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/454,449

(22) Filed: Aug. 7, 2014

(65) Prior Publication Data
US 2015/0043486 A1 Feb. 12, 2015

Related U.S. Application Data

(60) Provisional application No. 61/864,298, filed on Aug. 9, 2013.

(51) Int. Cl.
H04W 72/04 (2009.01)
H04W 76/16 (2018.01)
H04W 28/08 (2009.01)
H04W 88/06 (2009.01)
H04W 88/10 (2009.01)

(52) U.S. Cl.
CPC ....... *H04W 72/0406* (2013.01); *H04W 28/08* (2013.01); *H04W 76/16* (2018.02); *H04W 88/06* (2013.01); *H04W 88/10* (2013.01)

(58) Field of Classification Search
CPC .......... H04L 2012/5608; H04W 84/12; H04W 88/08; H04W 80/04; H04W 88/06; H04W 84/18; H04W 74/08

USPC ..... 370/310.2, 328, 338, 325, 277, 278, 281
See application file for complete search history.

(56) References Cited

U.S. PATENT DOCUMENTS

| 8,532,653 | B2 | 9/2013 | Zisimopoulos et al. |
| 9,001,778 | B2* | 4/2015 | Chin ................... H04W 56/001 370/329 |
| 9,247,473 | B2* | 1/2016 | Zhao ..................... H04W 36/32 |
| 9,532,399 | B2* | 12/2016 | Kalhan ................. H04W 88/10 |
| 2005/0026616 | A1* | 2/2005 | Cavalli ............. H04W 36/0083 455/436 |

(Continued)

FOREIGN PATENT DOCUMENTS

| CN | 102484885 A | 5/2012 |
| CN | 102984759 A | 3/2013 |

(Continued)

OTHER PUBLICATIONS

International Search Report and Written Opinion—PCT/US2014/050325—ISA/EPO—dated Dec. 19, 2014

(Continued)

*Primary Examiner* — Brenda H Pham
(74) *Attorney, Agent, or Firm* — Patterson & Sheridan, LLP

(57) ABSTRACT

Methods and apparatus for switching bearers between radio access technologies (RATs) are described. According to aspects of the present disclosure, the uplink part of a bearer may be served by one RAT, while the downlink part of the bearer is served by another RAT. A part of a bearer may be served by more than one RAT. Methods and apparatus for communicating via bearer with parts served by differing RATs are also described.

32 Claims, 7 Drawing Sheets

(56) References Cited

U.S. PATENT DOCUMENTS

| | | | |
|---|---|---|---|
| 2005/0073972 A1* | 4/2005 | Hasegawa | H04B 1/44 370/328 |
| 2005/0073977 A1* | 4/2005 | Vanghi | H04W 36/0066 370/335 |
| 2009/0111468 A1* | 4/2009 | Burgess | H04W 36/14 455/436 |
| 2009/0137214 A1* | 5/2009 | Hofmann | H04B 7/022 455/82 |
| 2009/0213819 A1* | 8/2009 | Kalhan | H04W 48/12 370/338 |
| 2010/0189084 A1 | 7/2010 | Chen et al. | |
| 2010/0316021 A1* | 12/2010 | Lerzer | H04W 88/06 370/331 |
| 2011/0044218 A1* | 2/2011 | Kaur | H04W 76/026 370/310 |
| 2011/0275359 A1 | 11/2011 | Sebire et al. | |
| 2011/0319072 A1 | 12/2011 | Ekici et al. | |
| 2011/0319073 A1* | 12/2011 | Ekici | H04W 48/18 455/426.1 |
| 2012/0039226 A1* | 2/2012 | Yang | H04W 52/0277 370/311 |
| 2012/0140743 A1 | 6/2012 | Pelletier et al. | |
| 2012/0163248 A1 | 6/2012 | Chin et al. | |
| 2012/0289170 A1* | 11/2012 | Li | H04W 72/085 455/73 |
| 2013/0028069 A1* | 1/2013 | Pelletier | H04W 72/0453 370/216 |
| 2013/0044709 A1* | 2/2013 | Adjakple | H04W 76/15 370/329 |
| 2014/0043979 A1* | 2/2014 | Etemad | H04W 4/70 370/237 |
| 2014/0213256 A1* | 7/2014 | Meylan | H04W 36/22 455/436 |

FOREIGN PATENT DOCUMENTS

| | | |
|---|---|---|
| CN | 103139882 A | 6/2013 |
| CN | 103238368 A | 8/2013 |
| EP | 2744260 A1 | 6/2014 |
| JP | 2013502850 A | 1/2013 |
| WO | WO-2011022570 A1 | 2/2011 |
| WO | WO-2011157129 A2 | 12/2011 |
| WO | WO-2012074878 A2 | 6/2012 |
| WO | WO-2012087358 A1 | 6/2012 |
| WO | WO-2012167743 A1 | 12/2012 |
| WO | WO-2013034052 A1 | 3/2013 |

OTHER PUBLICATIONS

Nokia Siemens Networks, Nokia, "Aggregating HSDPA and LTE Carriers", 3GPP TSG-RAN WG1 Meeting #64 R1-111060, Feb. 25, 2011, pp. 3. URL, http://www.3gpp.org/ftp/tsg_ran/WG1_RL1/TSGR1_64/Docs/R1-111060.zip.

LG Electronics Inc., "Comparison of Access Network Selection Solutions", 3GPP TSG-RAN WG2#82 R2-132055, May 20, 2013, pp. 1-6.

Qualcomm Incorporated, et al., "Text Proposal on WLAN/3GPP Radio Interworking Solution 3", 3GPP TSG-RAN WG2#82 R2-132194, May 20, 2013, pp. 1-5.

Ericsson, et al., "Further Discussions on UL/DL Split", 3GPP TSG-RAN WG2 #82, R2-131678, Fukuoka, Japan, May 20-24, 2013, May 24, 2013, 6 Pages, URL: http://www.3gpp.org/ftp/tsg_ran/WG2_RL2/TSGR2_82/Docs/R2-131678.zip.

\* cited by examiner

DISJOINT BEARER ROUTING

CROSS-REFERENCE TO RELATED APPLICATIONS

The present application for patent claims priority to U.S. Provisional Application No. 61/864,298, filed Aug. 9, 2013, which is assigned to the assignee of the present application and hereby expressly incorporated by reference herein in its entirety.

BACKGROUND

Field of the Disclosure

Certain aspects of the present disclosure generally relate to wireless communications and, more particularly, to techniques for switching bearers between radio access technologies (RATs).

Description of the Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3$^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

In some cases, such a system may allow traffic to be offloaded from one network, such as a wireless wide area network (WWAN) to a second network, such as a wireless local area network (WLAN).

SUMMARY

Certain aspects of the present disclosure provide a method for wireless communications performed by a base station (BS). The method generally includes establishing a data connection with a user equipment (UE) via one or more data bearers, making a first determination whether to route uplink traffic for each data bearer from the UE via a first radio access technology (RAT) or a second RAT, making a second determination whether to route downlink traffic for each data bearer to the UE via the first RAT or the second RAT, and participating in the data connection based on the first and second determinations.

Certain aspects of the present disclosure provide a method for wireless communications performed by a user equipment (UE). The method generally includes receiving a configuration indicating one or more data bearers are to be sent via a first radio access technology (RAT) and a second RAT, wherein the uplink and downlink traffic for data bearers is independently configured for routing via the first RAT and the second RAT, and sending a configuration complete message in response to the received configuration.

Certain aspects of the present disclosure provide an apparatus for wireless communications. The apparatus generally includes a processor configured to establish a data connection with a user equipment (UE) via one or more data bearers, make a first determination whether to route uplink traffic for each data bearer from the UE via a first radio access technology (RAT) or a second RAT, make a second determination whether to route downlink traffic for each data bearer to the UE via the first RAT or the second RAT, and participate in the data connection based on the first and second determinations, and a memory coupled to the processor.

Certain aspects of the present disclosure provide an apparatus for wireless communications. The apparatus generally includes a processor configured to receive a configuration indicating one or more data bearers are to be sent via a first radio access technology (RAT) and a second RAT, wherein the uplink and downlink traffic for data bearers is independently configured for routing via the first RAT and the second RAT, and send a configuration complete message in response to the received configuration and a memory coupled to the processor.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate certain typical aspects of this disclosure and are therefore not to be considered limiting of its scope, for the description may admit to other equally effective aspects.

DETAILED DESCRIPTION

Figure 1:
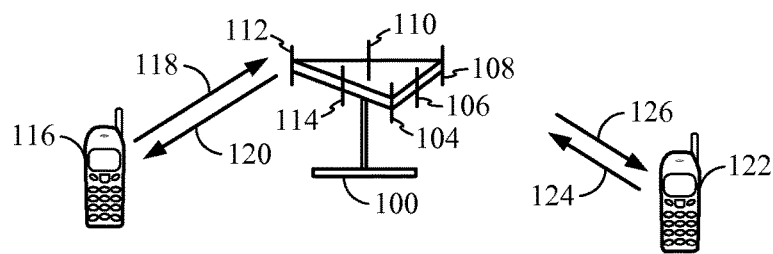
FIG. 1 illustrates an example multiple access wireless communication system in accordance with certain aspects of the present disclosure.

As demand for wireless services increases, network operators may desire to offload user device traffic from a wireless wide area network (WWAN), for example, a cellular network, to a wireless local area network (WLAN), for example, a Wi-Fi WLAN, to reduce congestion on the WWAN, and because operator deployed WLANs are often under-utilized. According to aspects of the present disclosure, a user equipment (UE) may be simultaneously connected to a base station of a WWAN (e.g., an eNodeB) and a base station of a WLAN (e.g., a Wi-Fi AP), which provide radio access links to transport signaling and data traffic to and from the UE. Data for each active service (e.g., services carrying voice traffic for a phone call, email services, web-browser services, etc.) on a UE may be carried via one or more bearers to or from network entities (e.g., core network servers). A bearer establishes a "virtual" connection or pipeline between two endpoints so that traffic can be sent between the endpoints. A bearer typically carries traffic both to and from a UE (e.g., downlink and uplink traffic). According to certain aspects of the present disclosure, bearers for some services may be routed over one or more WLANs (e.g., Wi-Fi WLANs), while bearers for other services are routed over a WWAN (e.g., a 3GPP radio access network (RAN)). The present disclosure provides methods and apparatuses to enable traffic for a bearer to a UE to be carried via a WLAN BS while traffic for the same bearer from the UE is carried via a WWAN BS, and vice-versa. The WWAN BS and the WLAN BS may be collocated or non-collocated. According to certain aspects of the present disclosure, methods to determine whether to switch bearers and configure them to be served on a WWAN or a WLAN are described. According to certain aspects of the present disclosure, whether to switch bearers may be determined based on the main objectives of serving bearers with a "better" link for each bearer, while maximizing a system utility function. In certain aspects, the better link may be determined based in part on a user's channel conditions, traffic, and other users sharing the same link.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and substantially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated in which procedures described for reducing the time to begin acquisition of wireless networks may be performed. An access point 100 (AP) may include multiple antenna groups, one group including antennas 104 and 106, another group including antennas 108 and 110, and an additional group including antennas 112 and 114. In FIG. 1, two antennas are shown for each antenna group; however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
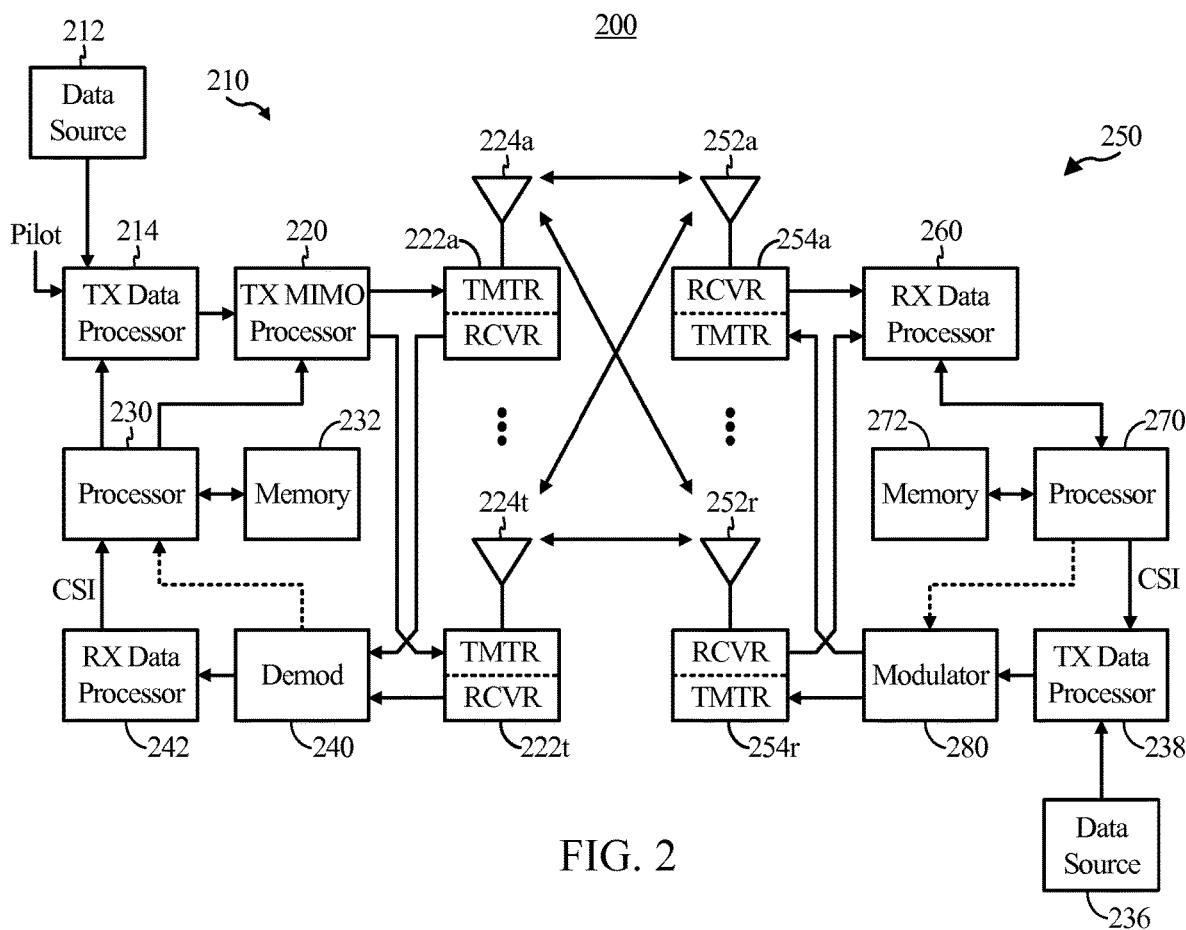
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
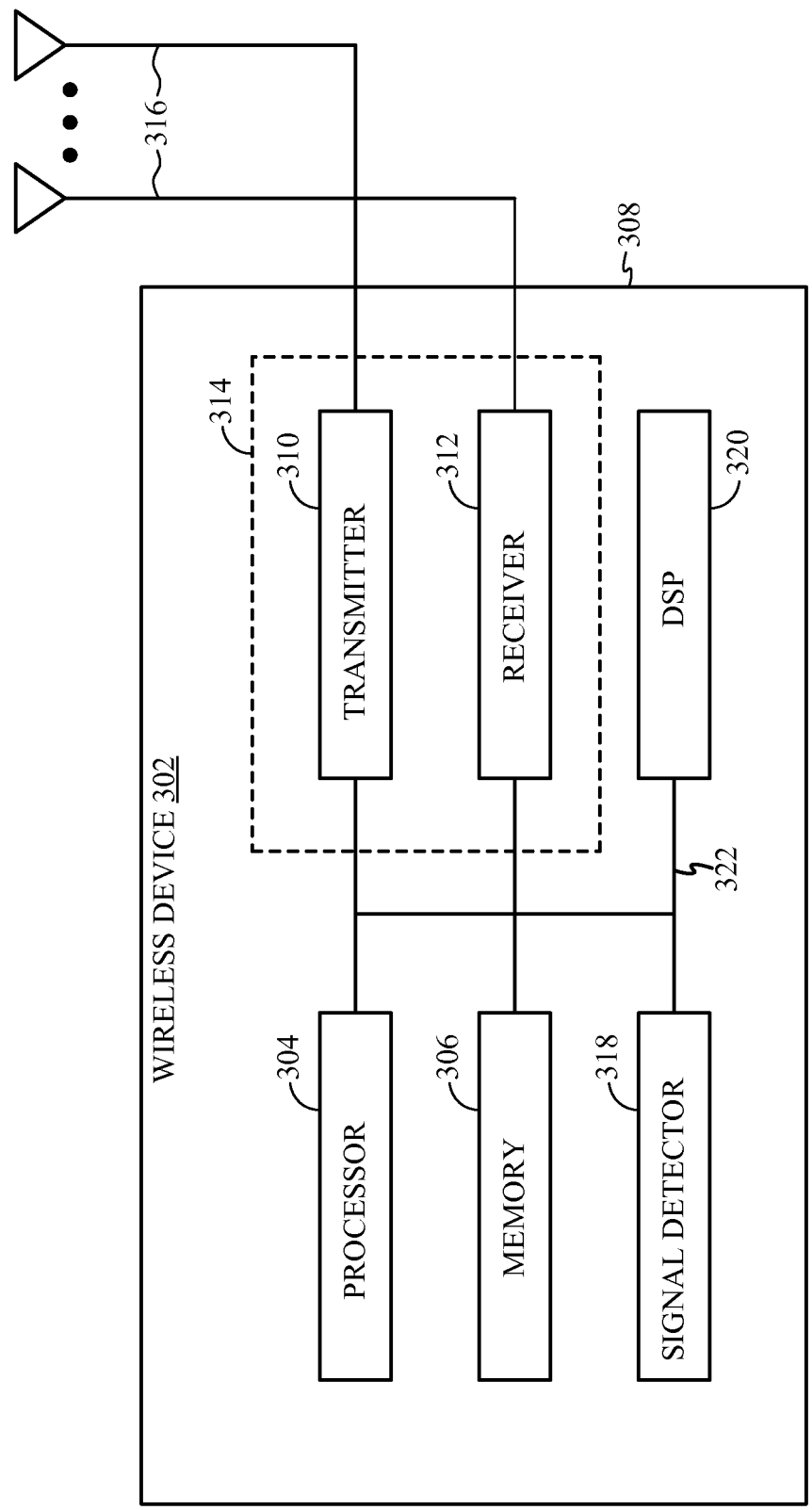
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single transmit antenna or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
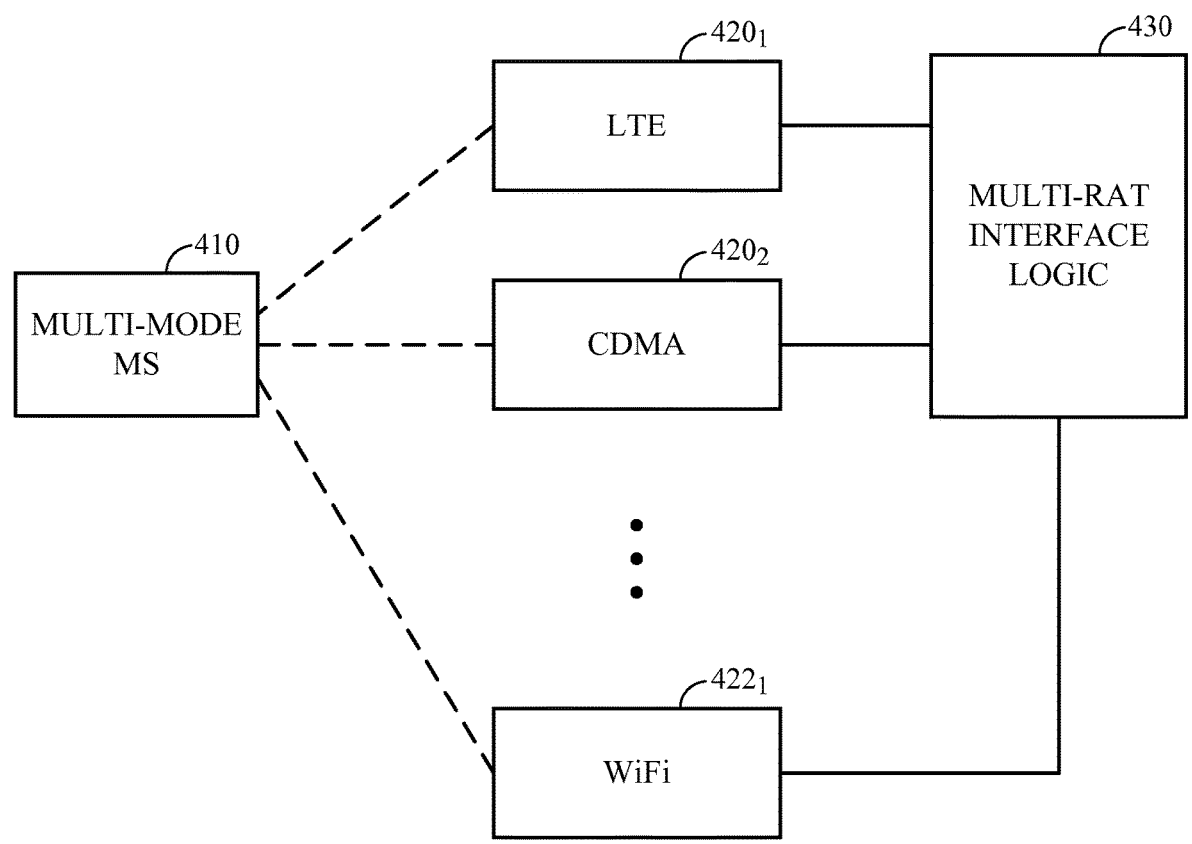
FIG. 4 illustrates an example multi-mode mobile station, in accordance with certain aspects of the present disclosure.

In order to expand the services available to subscribers, some mobile stations (MS) support communications with multiple radio access technologies (RATs). For example, as illustrated in FIG. 4, a multi-mode MS 410 may support LTE for broadband data services and code division multiple access (CDMA) for voice services. Illustratively, LTE is shown as a first RAT $420_1$, CDMA is shown as a second RAT $420_2$, and Wi-Fi is shown as a third RAT $422_1$.

In certain applications, multi-RAT interface logic 430 may be used to exchange information between both long-range RATs (i.e., WWANs) and short-range RATs (i.e., WLANs). This may enable a network provider to control how (through which RAT) an end user of the multi-mode MS 410 actually connects to the network. The interface logic 430 may support, for example, local IP connectivity or IP connectivity to a core network.

For example, a network provider may be able to direct the multi-mode MS to connect to the network via short-range RAT (e.g., Wi-Fi), when available. This capability may allow a network provider to route traffic in a manner that eases congestion of particular air resources. In effect, the network provider may use short-range RATs to distribute some air traffic (of a long-range RAT) into a wireline network or to distribute some air traffic from a congested wireless network to a less congested wireless network. The traffic may be re-routed from the short-range RAT when conditions mandate, such as when a mobile user increases speed to a certain level not suitable for a short-range RAT.

Further, since long-range RATs are typically designed to provide service over several kilometers, the power consumption of transmissions from a multi-mode MS when using a long-range RAT is non-trivial. In contrast, short-range RATs (e.g., Wi-Fi) are designed to provide service over several hundred meters. Accordingly, utilizing a short-range RAT when available may result in less power consumption by the multi-mode MS 410 and, consequently, longer battery life.

Figure 5:
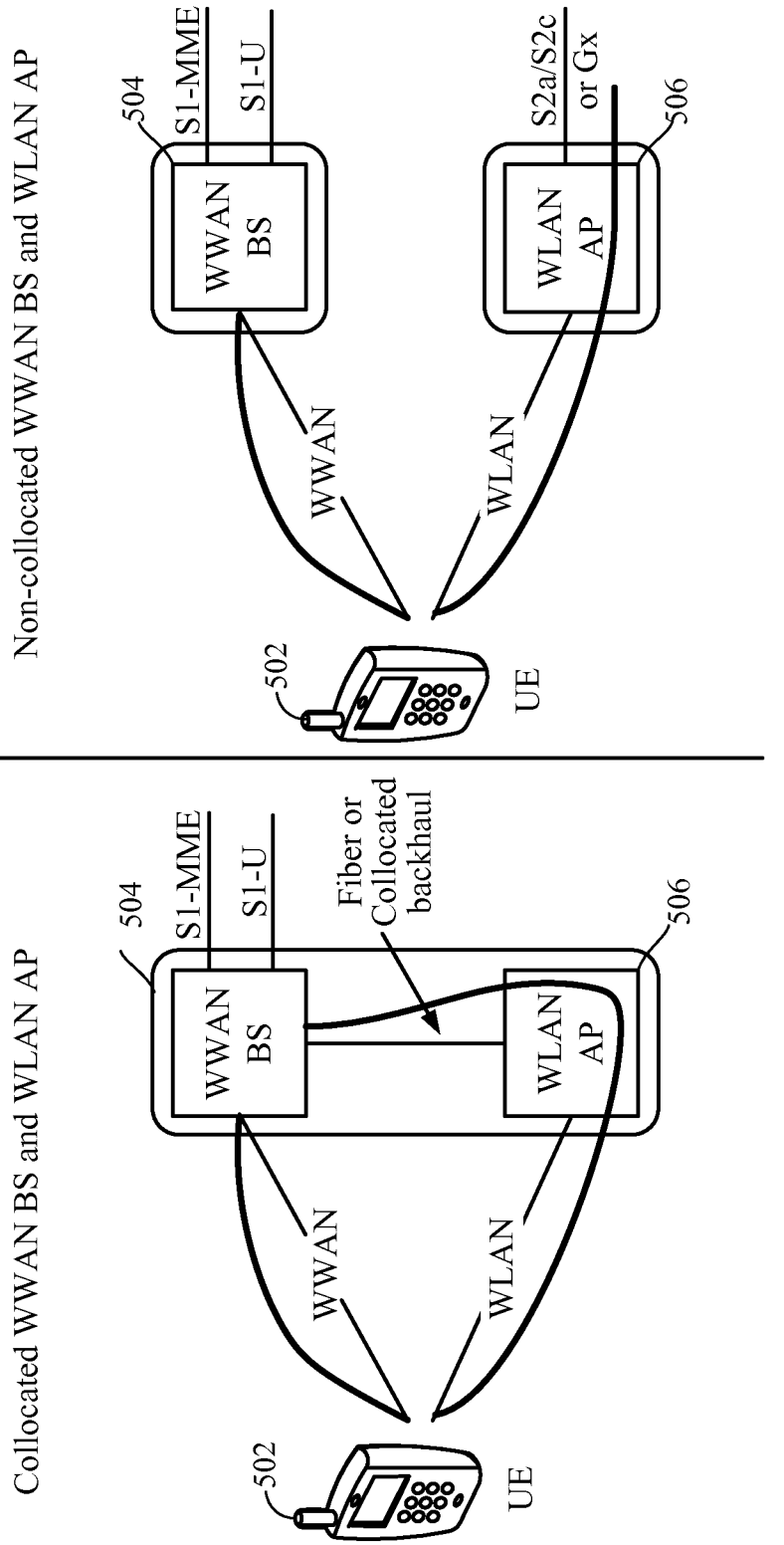
FIG. 5 illustrates two reference cellular-WLAN interworking architectures for a wireless local area network (WLAN) and a 3GPP eNodeB with disjoint bearer routing, in accordance with certain aspects of the present disclosure.

FIG. 5 illustrates a reference WWAN-WLAN interworking architecture for a WLAN AP 506 (e.g., a Wi-Fi AP) and a WWAN BS 504 (e.g., a 3GPP eNodeB). The architecture is one embodiment of interworking functionality between 3GPP and WLAN systems. This permits use of a WLAN access service by 3GPP subscribers. As illustrated, the WWAN BS and WLAN BS may be collocated or non-collocated. A user equipment (UE) 502 may use different Internet protocol (IP) addresses and separate packet data network (PDN) connections with the WWAN BS and at the WLAN AP. The data planes for WLAN and 3GPP are substantially independent, and there may be no session continuity (e.g., mobility support for the WLAN) for the UE. In other words, the UE 502 may become aware of a WLAN AP independently and establish a new session with each WLAN AP the UE finds or becomes aware of Certain aspects of the present disclosure provide techniques for a cellular network controlling a UE accessing and offloading traffic to a WLAN.

A UE such as UE 502 may become aware of WLAN APs by performing scanning procedures as specified in IEEE 802.11, which generally include passive scanning and active scanning Passive scanning, as defined in IEEE 802.11, may be inefficient for the UE, as the UE waits, with receiver on, for the reception of a WLAN beacon from a WLAN AP. As the beacon transmission interval is approximately one-hundred milliseconds and there may be dozens of channels to scan, passive scanning may result in high power consumption for scanning and high scan latency. Active scanning may be faster than passive scanning, but active scanning adds traffic to the WLAN, namely probe requests and probe responses. Active scanning is also power intensive.

IEEE 802.11u has defined additional mechanisms for a UE to discover further information about an AP without being associated with the AP. For example, a generic advertisement service (GAS) may provide a transport of an advertisement protocol's frames between the UE and a server in the network. The AP may be responsible for the relay of a mobile device's query to a server in the carrier's network and for delivering the server's response back to the mobile. An example of another mechanism for a UE to discover information about an AP is access network query protocol (ANQP), which is generally a query advertisement protocol for access network information retrieval by the UE/STA from the AP that is transported over the generic advertisement service (GAS). Information retrieved via ANQP may include a Hotspot operator's domain name, roaming partners accessible via the Hotspot along with their credential type and extensible authentication protocol (EAP) method supported for authentication, IP address type availability, and other metadata useful in the UE's network selection process.

A UE may not have to associate with a WLAN AP in order to provide measurements of the WLAN AP to network entities (e.g., a mobility management entity (MME) or radio network controller (RNC)). The UE may support a subset of additional procedures as defined in IEEE 802.11k, IEEE 802.11u and Hotspot 2.0. With regards to a radio access network (RAN), there may be no interface between the AP and the BS, as illustrated in the non-collocated WWAN BS and WLAN AP of FIG. 5. ANQP may be utilized to determine information regarding operator-controlled WLAN APs that do not exchange loading or neighbor information with WWAN base stations over the backhaul. However, in the case of a collocated AP and WWAN BS, IEEE 802.11k, IEEE 802.11u, and Hotspot 2.0 information on the AP may be known in the WWAN BS (e.g., via a backhaul link) and the UE may not be required to perform ANQP to acquire the information. When efficient passive scanning is enabled, the AP may transmit its beacons at the time advertised by the RAN. In other words, the AP may acquire cellular timing and system frame number (SFN) of the WWAN, and may transmit beacons at beacon transmission times advertised by the RAN. For certain aspects, two levels of reporting may be used to identify the AP: identifying the AP (e.g., based on BSSID), i.e., from beacon only, and providing IEEE 802.11k, IEEE 802.11u, or Hotspot 2.0 identifying information using ANQP (e.g., in the case of a non-collocated AP and eNB).

Disjoint Bearer Routing

According to certain aspects of the present disclosure, a user may be simultaneously connected to both a WWAN BS (e.g., an LTE eNB) and a WLAN BS (e.g., a Wi-Fi AP). This dual connectivity may provide radio access links to transport signaling and data traffic of the user, as described above with reference to FIG. 5. The user data or signaling bearers may be served by either WWAN or WLAN radio links, or both. Aspects of the present disclosure provide techniques to determine whether to switch bearers and to configure bearers to be served on WWAN or WLAN.

Figure 6:
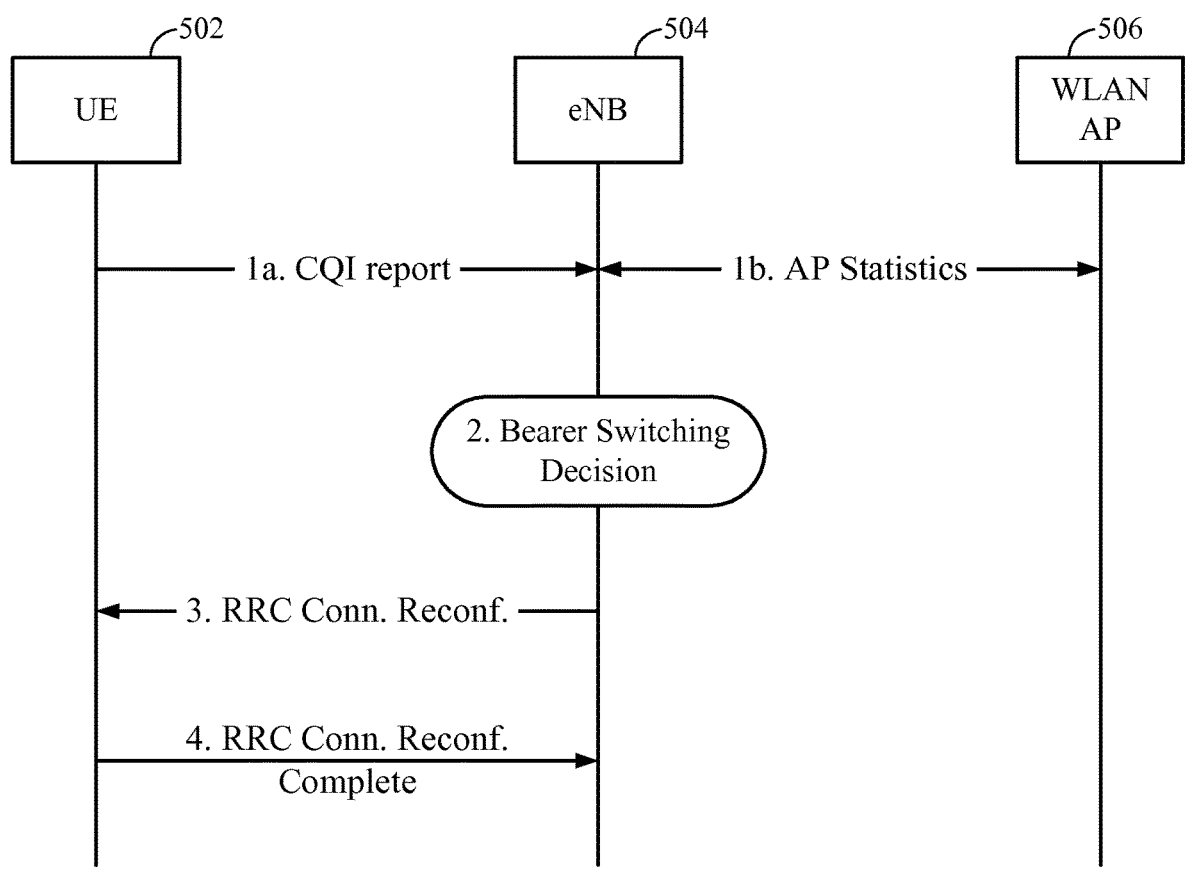
FIG. 6 illustrates an example process for switching bearers between radio access technologies (RATs), in accordance with certain aspects of the present disclosure.

In some cases, whether to switch bearers for a UE may be determined based on certain objectives, such as serving bearers with a "better" link for each bearer, while maximizing a system utility function. According to certain aspects, the better link may be determined based in part on a user's channel conditions, traffic, and other users sharing the same link. The WWAN BS (e.g., an eNB) may make the decision to switch bearers between WWAN and WLAN and may configure the UE via RRC, as shown in FIG. 6.

A radio bearer for a UE may have two directional parts. For example, one directional part may be from the UE and one directional part may be to the UE, called uplink and downlink, respectively, in 3GPP terminology. According to certain aspects of the present disclosure, the downlink and uplink parts of a radio bearer are not necessarily served on the same access link. According to these aspects, a data bearer's downlink (i.e. to the UE) may be served on a WLAN (e.g., Wi-Fi) access link, while the data bearer's uplink may be served on a WWAN (e.g., LTE) access link, or vice-versa. According to these aspects, the data traffic may be served by one access link in each direction at a given time.

According to aspects of the present disclosure, a directional part of a data bearer may be served by more than one access link. In aspects wherein a directional part of a data bearer is served by more than one access link, each packet of a transmission being carried by the data bearer may be transmitted via any of the access links serving the directional part of the data bearer. For example, a UE may be connected to a WWAN BS (e.g., an eNodeB) and a WLAN AP (e.g., a Wi-Fi AP), and a web-browser of the UE may request a web page from a server on the Internet. In the example, a downlink part of a data bearer serving the web-browser may be served by both the WWAN BS and the WLAN BS. In the example, some packets of data of the web page may be transmitted to the UE via the data bearer by the WWAN BS, while other packets of data of the web page may be transmitted to the UE via the data bearer by the WLAN AP. In a scenario wherein an access link is used to transmit downlink data to a UE but not uplink data from the UE, the access link may be referred to as a supplement downlink (SDL).

In the previously described example, the downlink part of a data bearer was served by more than one access link, but the disclosure is not so limited. According to aspects of the present disclosure, the uplink part of a data bearer may be served by more than one access link. In aspects of the present disclosure, both the uplink part and the downlink part of a data bearer may be served by more than one access link, and not necessarily the same access links.

When uplink and downlink parts of a bearer are served on different access links, the transmission of control messages on these links may need to be modified. For the RLC Acknowledged Mode (AM) in 3GPP, a bearer's downlink and uplink parts carry feedback messages for the other link, i.e. DL feedback messages are carried on UL and vice-versa. In current (e.g., Rel-8) wireless communications standards, this may present a problem when uplink and downlink of a bearer are served on different RATs. For example, a UE may receive a packet of data of a web page on a data bearer via a WLAN AP (e.g., a Wi-Fi AP), and transmit an acknowledgment (e.g., an ACK) of the packet on the data bearer via a WWAN BS (e.g., an eNodeB). In the example, the WLAN AP should attempt to transmit the same packet to the UE, if the WLAN AP is not informed of the acknowledgment from the UE. Solutions to the described problem are described in aspects of the present disclosure.

FIG. 6 illustrates a call flow of an exemplary process wherein WWAN BS 504 (e.g., an eNB) may follow in switching data bearers. At 1a and 1b, the eNB may obtain information regarding the channel conditions at the UE 502 (e.g., a CQI Report) and the operating statistics of the WLAN AP 506 (e.g., AP Statistics). According to some aspects, the eNB may obtain WLAN statistics from the UE. At 2, the eNB may make the bearer switching decision. At 3, the eNB may send RRC connection reconfiguration commands to the UE, and at 4, the eNB may receive a RRC connection reconfiguration complete message from the UE.

Since switching bearers between a WWAN (e.g., LTE) and a WLAN (e.g., Wi-Fi) may have a cost (e.g., interruption, delay, and possible performance impacts on upper layers), it is important to avoid excessive and unnecessary handovers. "Excessive" handovers may include ping-pong and too frequent switching, and "unnecessary" handovers may include handovers providing little gain or even losses, i.e., in total throughput, for the system as a whole.

According to certain aspects of the present disclosure, a bearer's control messages may be always served on a WWAN (e.g., LTE) while other (e.g., data) messages of the bearer (UL or DL) may be served on a different RAT (e.g., WLAN). In other words, a bearer may be configured such that control messages of the bearer are always routed via a WWAN access link, while other messages of the bearer are routed by one or more other RATs (e.g., Wi-Fi).

According to certain aspects of the present disclosure, control messages may be passed from a WLAN AP (e.g., a Wi-Fi AP) to a WWAN BS (e.g., an eNB) when transmitted from the UE to the WLAN AP. This may occur when an UL part of a bearer is being served by a WLAN AP. According to certain aspects of the present disclosure, control messages may be passed from an eNB to an AP when transmitted from the eNB to the UE. This may occur when the DL bearer is being served by an AP.

In some cases, the decision for switching a bearer may involve using statistics collected on each RAT. These statistics may include the following:

| RAT | Statistics that may used in a bearer switching decision |
|---|---|
| LTE | CQI and MCS per UE |
| | DL Buffer sizes per bearer and UL Buffer Status Report from the UE |
| Wi-Fi | MCS and RSSI per UE |
| | Transmitted and received traffic, failed and dropped packets, retry attempts |
| | Channel Load for the AP |

According to certain aspects of the present disclosure, switching decision processes may be initiated periodically. For example, an eNB with a collocated WLAN AP may initiate a switching process once each 1.28 seconds, using statistics gathered from the eNodeB, the WLAN AP, and served UEs to determine if bearers of served UEs should be switched to or from LTE to or from the WLAN.

According to certain aspects of the present disclosure, an event may trigger a switching decision process to enable the system to react to changing channel conditions. For example, a WLAN AP collocated with an eNB may detect a change to channel conditions for a served UE and trigger a switching decision process. In the example, the UE may have one or more bearers switched from the WLAN to LTE.

According to certain aspects of the present disclosure, for a bearer being served by Wi-Fi, a switching decision process may be triggered when the STA to AP RSSI is less than a threshold, or when the AP cannot select the lowest MCS during a time interval.

According to certain aspects of the present disclosure, for a bearer being served by LTE, the LTE CQI or MCS being lower than a threshold during a time interval may trigger a switching decision process.

According to certain aspects of the present disclosure, for a switch in either direction, the target link (i.e., the access link being switched to) should have channel conditions that are better than the source link (i.e., the access link being switched from). For example, an eNB with a collocated Wi-Fi AP system may be serving an uplink part of a bearer for a UE via LTE and a downlink part of the bearer via Wi-Fi. In the example, the system initiates a switching process and determines that the Wi-Fi link has better channel conditions than the LTE link. In the example, the system may switch the uplink part of the bearer to the Wi-Fi link, while the system may not switch the downlink part of the bearer to LTE, because the Wi-Fi link's channel conditions are superior to the LTE link's channel conditions.

According to certain aspects of the present disclosure, at switching instance times, the selection of bearers to be served on WWAN (e.g., LTE) or WLAN (e.g., Wi-Fi) may be the result of system optimization performed iteratively at switching instances. According to these aspects, the optimization may be for maximizing a total system utility, which may be defined based on a Proportional Fairness (PF) metric for the combined (e.g., LTE+Wi-Fi) system.

According to certain aspects of the present disclosure, fairness between bearers may be determined based on a PF metric. According to these aspects, at every switching time instance, the goal may be to increase the total system utility by the maximum amount. This goal may be achieved by an allocation of bearers to RATs maximizing the following function:

$$F(S)=\Sigma^k \Delta(X\_k)/X\_k \quad (1)$$

such that $S=(S\_k)$, wherein $S\_k=1$ if a bearer k is on LTE and 0 otherwise. In the function, k is a bearer index, $\Delta(X\_k)$ is the expected throughput for bearer k in the next switching interval period, and $X\_k$ is the total throughput of bearer k for the most recent measurement period (time indices are omitted in this notation for brevity). Note that S determines the "assignment" of each bearer to be served on either LTE or Wi-Fi. F(S) corresponds to the total system utility function.

In the above proportional fairness function, bearer index "k" may be for all of the bearer links in the system, including bearer links that may not be allowed to switch due to their configuration. Including bearer links that may not be switched incorporates the impact of all bearers in the system optimization. Furthermore, "k" may consider direction, in the sense that uplink parts and downlink parts of bearers may be considered separately.

According to certain aspects of the present disclosure, uplink parts and downlink parts of bearers may be always switched together. For these aspects, enforcing switching uplink parts and downlink parts of bearers together may be accomplished by discarding points S which do not obey this restriction in the PF algorithm.

According to certain aspects of the present disclosure, the above formulation gives the same priority to all bearers regardless of the traffic type or quality of service (QoS) class identifier (QCI) of any particular bearer. According to these aspects, LTE and Wi-Fi networks may continue to offer QoS to bearers via packet scheduling. If, for example, these schedulers give absolute higher priority between different QoS classes, the function F(S) may be modified to align the system utility with these schedulers. This can be done by defining F(S) such that it takes a vector value wherein each component of the vector is calculated as in (1) but for bearers in a particular QoS. The comparison of F(S) may then follow the priority order used by the mentioned scheduler.

According to certain aspects of the present disclosure, $X\_k$ may be an infinite impulse response (IIR) filtered value of the instantaneous throughput with a time constant larger than the switching interval. For both LTE and Wi-Fi, this may be measured at the eNB and/or AP. For these aspects, there may be two main operations for the solution of (1):

| Step | Operation |
|---|---|
| 1 | Estimate Δ(X_k) |
| 2 | Determine the optimal point S maximizing the sum in (1) |

Estimation of $\Delta(X\_k)$ may be accomplished by any of a number of estimating methods that may be performed by an eNB or other base station.

The optimal point S maximizing the sum in (1) may be determined by any of a number of maximizing methods that may be performed by an eNB or other base station. A probabilistic component can be added to the optimization step so that the best optimal point is not always selected, in order to prevent the algorithm from being stuck at a local optimum over an extended period of time.

Figure 7:
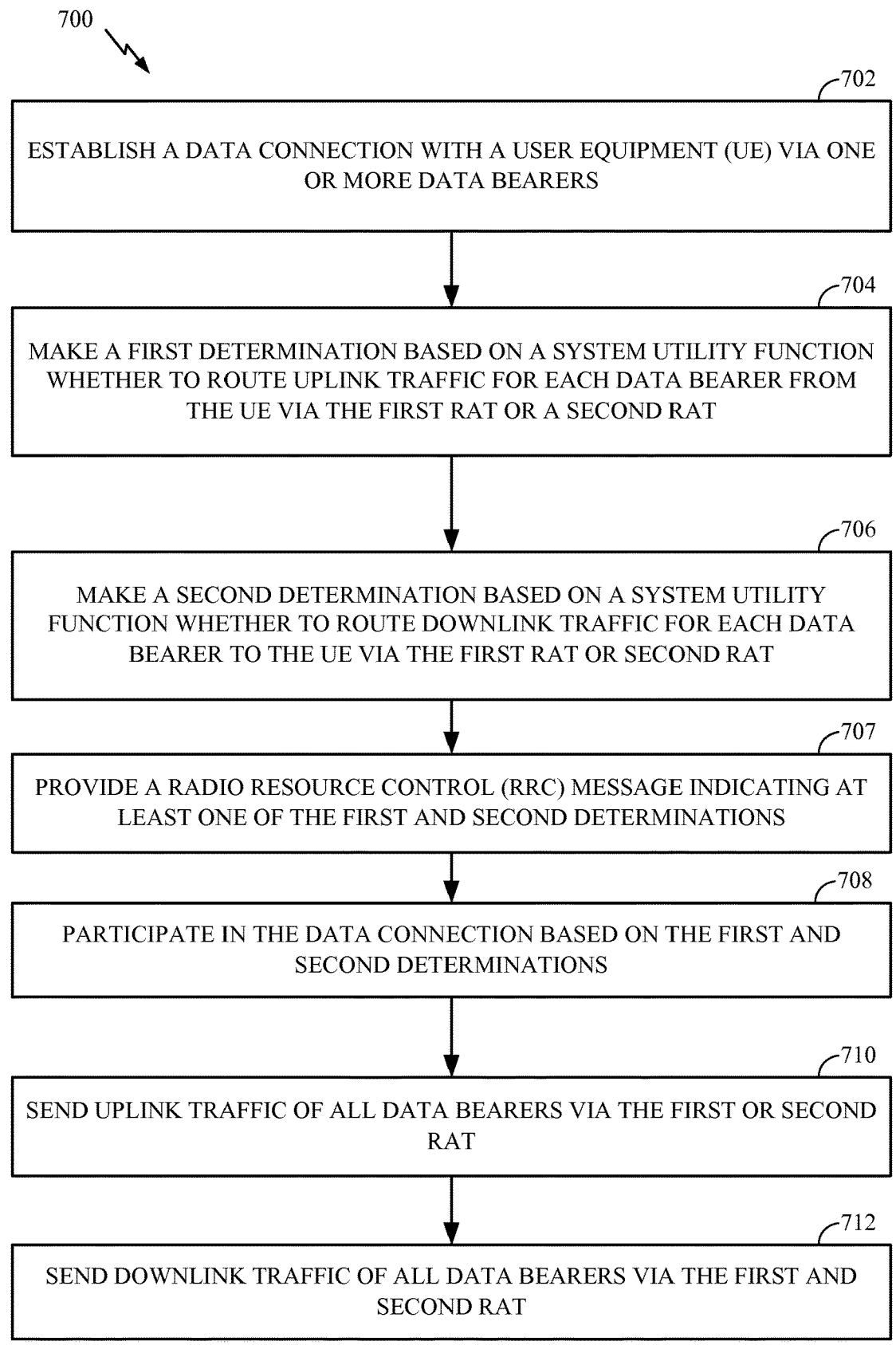
FIG. 7 sets forth exemplary operations performed by a base station for switching bearers between radio access technologies (RATs), in accordance with certain aspects of the present disclosure.

FIG. 7 sets forth exemplary operations 700 for switching data bearers between RATs at a wireless node. The operations 700 may be performed, for example, by a BS (e.g., an eNodeB or other type of base station/access point).

Operations 700 begin at 702, wherein the BS establishes a data connection with a user equipment (UE) via one or more data bearers. At 704, the BS makes a first determination whether to route uplink traffic for each data bearer from the UE via a first radio access technology (RAT) or a second RAT. At 706, the BS makes a second determination whether to route downlink traffic for each data bearer to the UE via the first RAT or the second RAT. At 707, the BS may optionally provide a radio resource control (RRC) message indicating at least one of the first and second determinations. At 708, the BS participates in the data connection based on the first and second determinations. At 710, the BS may optionally send uplink traffic of all data bearers via the first or second RAT. At 712, the BS may optionally send downlink traffic of all data bearers via the first and second RAT.

According to certain aspects of the present disclosure, the first determination may comprise a determination to send uplink traffic of all data bearers via the first RAT.

According to aspects of the present disclosure, the second determination may comprise a determination to send downlink traffic of one or more data bearers via both the first RAT and the second RAT.

In aspects of the present disclosure, the first RAT may comprise a wireless wide-area network (WWAN), and the second RAT may comprise a wireless local area network (WLAN).

According to certain aspects of the present disclosure, at least one of the first or second determinations may be based on a predetermined configuration that specifies at least one of uplink or downlink traffic should be routed to a particular RAT.

According to certain aspects of the present disclosure, at least one of the first or second determinations may be based on optimization of a system utility function comprising expected performance of one or more data bearers routed via the first RAT or second RAT. According to certain aspects of the present disclosure, the system utility function may consider both uplink and downlink traffic of the data bearers. In certain aspects of the present disclosure, the system utility function may consider at least one of a current assignment of data bearers to each RAT, channel and traffic conditions on the first RAT and the second RAT, and resource utilization and channel loads on each RAT. According to certain aspects of the present disclosure, the system utility function may comprise a proportional fairness function.

According to certain aspects of the present disclosure, the first and second determinations may be made periodically.

According to certain aspects of the present disclosure, the routing of downlink and uplink traffic from one RAT to the other RAT may be switched based on a deterioration of channel conditions of the one RAT without waiting for a periodic determination.

According to certain aspects of the present disclosure, a first delay of a certain time after switching the routing of uplink or downlink traffic of a data bearer may be implemented before switching the routing again.

According to certain aspects of the present disclosure, the number of times a routing of uplink or downlink traffic of a data bearer may be switched during a time period may be limited.

Figure 8:
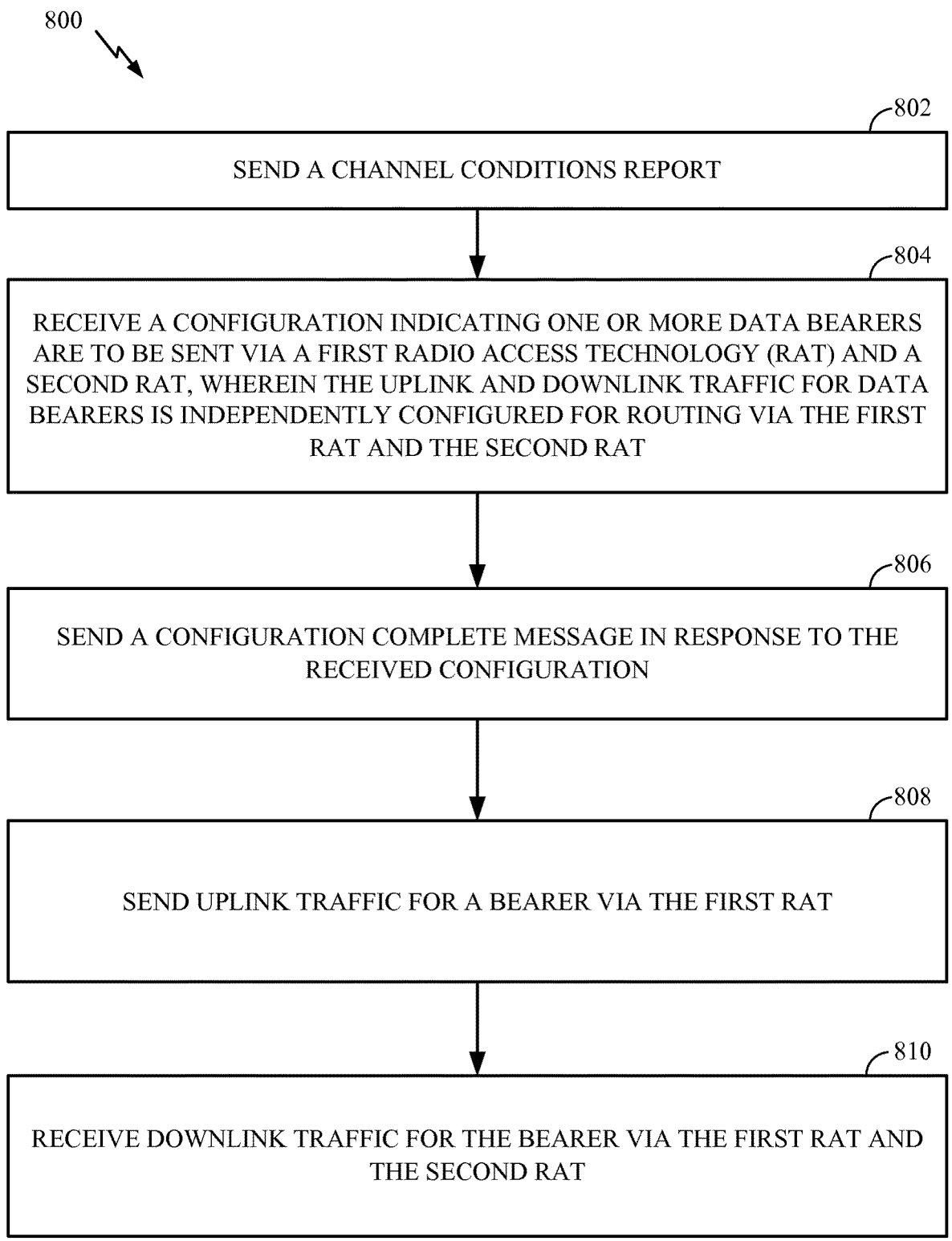
FIG. 8 sets forth exemplary operations performed by a user equipment for switching bearers between radio access technologies (RATs), in accordance with certain aspects of the present disclosure.

FIG. 8 sets forth exemplary operations 800 for switching bearers between radio access technologies (RATs), in accordance with certain aspects of the present disclosure. The operations 800 may be performed by a UE, for example.

Operations 800 begin at 802, wherein the UE may optionally send a channel conditions report. At 804, the UE receives a configuration indicating one or more data bearers are to be sent via a first radio access technology (RAT) and a second RAT, wherein the uplink and downlink traffic for data bearers is independently configured for routing via the first RAT and the second RAT. At 806, the UE sends a configuration complete message in response to the received configuration. At 808, the UE may optionally send uplink traffic for a bearer via the first RAT. At 810, the UE may optionally receive downlink traffic for the bearer via the first RAT and the second RAT.

According to aspects of the present disclosure, the UE may receive the configuration in an RRC message. For example, an eNodeB may send an RRC message configuring a served UE to send UL traffic for all data bearers via LTE to the eNodeB, receive DL traffic for phone calls via LTE, and receive DL traffic for web-browsing via Wi-Fi.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a first base station (BS), comprising:
   establishing a data connection with a user equipment (UE) via one or more data bearers;
   making, for a first data bearer of the one or more data bearers, a corresponding first determination to route uplink traffic from the UE during a period via the first BS or a second BS different from the first BS;
   making, for the first data bearer of the one or more data bearers, a corresponding second determination, independent of the first determination, to route downlink traffic to the UE during the period via the first BS or the second BS, wherein the period ends when the first BS makes a next first determination or a next second determination for the first data bearer of the one or more data bearers; and
   participating in the data connection based on the first and second determinations, wherein the participating comprises:
   receiving, during the period, all uplink traffic for the first data bearer according to the corresponding first determination, and
   transmitting, during the period, all downlink traffic for the first data bearer according to the corresponding second determination.

2. The method of claim 1, further comprising determining to send uplink traffic of all of the data bearers via the first BS.

3. The method of claim 2, wherein the first BS is a BS of a wireless wide-area network (WWAN) radio access technology (RAT) and the second is a BS of a wireless local area network (WLAN) RAT.

4. The method of claim 2, wherein the second determination comprises a determination to send downlink traffic of one or more data bearers via both the first BS and the second BS.

5. The method of claim 2, wherein the first BS is a BS of a first wireless wide-area network (WWAN) radio access technology (RAT) and the second BS is a BS of a second wireless wide-area network (WWAN) RAT.

6. The method of claim 1, wherein:
one of the first BS or the second BS is a BS of a wireless wide-area network (WWAN) radio access technology (RAT); and
the other of the first BS or the second BS is a BS of a wireless local area network (WLAN) RAT.

7. The method of claim 1, wherein at least one of the first or second determinations is based on a predetermined configuration that specifies at least one of uplink or downlink traffic should be routed to a particular radio access technology (RAT).

8. The method of claim 1, wherein at least one of the first or second determinations is based on optimization of a system utility function comprising expected performance of the one or more data bearers routed via the first BS or the second BS.

9. The method of claim 1, further comprising:
providing a radio resource control (RRC) message indicating at least one of the first or the second determinations.

10. A method for wireless communications, comprising:
receiving, from a first base station (BS), a first configuration indicating uplink traffic during a period for a first data bearer of one or more data bearers is to be sent via the first BS or a second BS different from the first BS, and downlink traffic during the period for the first data bearer of the one or more data bearers is to be sent via the first BS or the second BS, wherein the uplink and downlink traffic for the first data bearer of the one or more data bearers is independently configured for routing via the first BS or the second BS and wherein the period ends upon receiving a second configuration, different from the first configuration, from the first BS indicating uplink traffic during another period for the first data bearer of the one or more data bearers is to be sent via the first BS or the second BS, and downlink traffic during the other period for the first data bearer of the one or more data bearers is to be sent via the first BS or the second BS; and
sending, via the first BS or the second BS, a configuration complete message to the first BS in response to the first configuration.

11. The method of claim 10, further comprising:
sending uplink traffic, during the period, for the first data bearer of the one or more data bearers via the first BS; and
receiving downlink traffic, during the period, for the first data bearer via the first BS and the second BS.

12. The method of claim 11, wherein the first BS is a BS of a wireless wide-area network (WWAN) radio access technology (RAT).

13. The method of claim 12, wherein the second BS is a BS of a second wireless wide-area network (WWAN) RAT.

14. The method of claim 10, wherein:
one of the first BS or the second BS is a BS of a wireless wide-area network (WWAN) radio access technology (RAT); and
the other of the first BS or the second BS is a BS of a wireless local area network (WLAN) RAT.

15. The method of claim 10, wherein the first configuration is received in a radio resource control (RRC) message.

16. The method of claim 10, further comprising:
sending a channel conditions report, wherein the first configuration is based on the channel conditions report.

17. An apparatus for wireless communications, comprising:
a processor configured to:
establish a data connection with a user equipment (UE) via one or more data bearers;
make, for a first data bearer of the one or more data bearers, a corresponding first determination to route uplink traffic from the UE during a period via a first base station (BS) or a second BS different from the first BS;
make, for the first data bearer of the one or more data bearers, a corresponding second determination, independent of the first determination, to route downlink traffic to the UE during the period via the first BS or the second BS, wherein the period ends when the processor makes a next first determination or a next second determination for the first data bearer of the one or more data bearers; and
participate in the data connection based on the first and second determinations by:
receiving, during the period, all uplink traffic for the first data bearer according to the corresponding first determination, and
transmitting, during the period, all downlink traffic for the first data bearer according to the corresponding second determination; and
a memory coupled to the processor.

18. The apparatus of claim 17, wherein the processor is configured to make the first determination by determining to send uplink traffic of all of the data bearers via the first BS.

19. The apparatus of claim 18, wherein the first BS is a BS of a wireless wide-area network (WWAN) radio access technology (RAT) and the second BS is a BS of a wireless local area network (WLAN) RAT.

20. The apparatus of claim 18, wherein the second determination comprises a determination to send downlink traffic of one or more data bearers via both the first BS and the second BS.

21. The apparatus of claim 17, wherein:
one of the first BS or the second BS is a BS of a wireless wide-area network (WWAN) radio access technology (RAT); and
the other of the first BS or the second BS is a BS of a wireless local area network (WLAN) RAT.

22. The apparatus of claim 17, wherein the processor is configured to make at least one of the first or second determinations based on a predetermined configuration that specifies at least one of uplink or downlink traffic should be routed to a particular radio access technology (RAT).

23. The apparatus of claim 17, wherein the processor is configured to make at least one of the first or second determinations based on optimization of a system utility function comprising expected performance of the one or more data bearers routed via the first BS or the second BS.

24. The apparatus of claim 17, wherein the processor is further configured to:
provide a radio resource control (RRC) message indicating at least one of the first determination or the second determination.

25. The apparatus of claim 17, wherein the first BS is a BS of a first wireless wide-area network (WWAN) radio access technology (RAT) and the second BS is a BS of a second wireless wide-area network (WWAN) RAT.

26. An apparatus for wireless communications, comprising:
- a processor configured to:
  - receive, from a first base station (BS), a first configuration indicating uplink traffic during a period for a first data bearer of one or more data bearers is to be sent via the first BS or a second BS different from the first BS, and downlink traffic during the period for the first data bearer of the one or more data bearers is to be sent via the first BS or the second BS, wherein the uplink and downlink traffic for the first data bearer of the one or more data bearers is independently configured for routing via the first BS or the second BS and wherein the period ends upon receiving a second configuration, different from the first configuration, from the first BS indicating uplink traffic during another period for the first data bearer of the one or more data bearers is to be sent via the first BS or the second BS, and downlink traffic during the other period for the first data bearer of the one or more data bearers is to be sent via the first BS or the second BS; and
  - send, via the first BS or the second BS, a configuration complete message to the first BS in response to the first configuration; and
- a memory coupled to the processor.

27. The apparatus of claim 26, wherein the processor is further configured to:
- send uplink traffic, during the period, for the first data bearer of the one or more data bearers via the first BS; and
- receive downlink traffic, during the period, for the first data bearer via the first BS and the second BS.

28. The apparatus of claim 27, wherein the first BS is a BS of a wireless wide-area network (WWAN) radio access technology (RAT).

29. The apparatus of claim 28, wherein the second BS is a BS of a second wireless wide-area network (WWAN) RAT.

30. The apparatus of claim 26, wherein:
- one of the first BS or the second BS is a BS of a wireless wide-area network (WWAN) radio access technology (RAT); and
- the other of the first BS or the second BS is a BS of a wireless local area network (WLAN) RAT.

31. The apparatus of claim 26, wherein the processor is configured to receive the first configuration in a radio resource control (RRC) message.

32. The apparatus of claim 26, wherein the processor is further configured to:
- send a channel conditions report, wherein the first configuration is based on the channel conditions report.

* * * * *